United States Patent [19]

Takagi

[11] Patent Number: 4,653,021

[45] Date of Patent: Mar. 24, 1987

[54] DATA MANAGEMENT APPARATUS

[75] Inventor: Shiro Takagi, Yokohama, Japan

[73] Assignee: Kabushiki Kaisha Toshiba, Kawasaki, Japan

[21] Appl. No.: 620,826

[22] Filed: Jun. 15, 1984

[30] Foreign Application Priority Data

Jun. 21, 1983 [JP] Japan .................................. 58-110159

[51] Int. Cl.⁴ .............................................. G06F 3/00
[52] U.S. Cl. ..................................... 364/900; 382/56
[58] Field of Search ... 364/200 MS File, 900 MS File, 364/300, 581; 382/56, 57

[56] References Cited

U.S. PATENT DOCUMENTS

| | | | |
|---|---|---|---|
| 3,952,184 | 4/1976 | Bassard | 364/300 |
| 4,041,463 | 8/1977 | Slutzky et al. | 364/900 |
| 4,122,518 | 10/1978 | Castleman et al. | 364/300 |
| 4,276,597 | 6/1981 | Dissly et al. | 364/200 |
| 4,290,114 | 9/1981 | Sinay | 364/300 |
| 4,318,184 | 3/1982 | Millett et al. | 364/900 |
| 4,365,303 | 12/1982 | Hannah et al. | 364/300 |
| 4,370,707 | 1/1983 | Phillips et al. | 364/300 |
| 4,408,181 | 10/1983 | Nakayama | 364/900 |
| 4,420,816 | 12/1983 | Yoshida | 364/900 |
| 4,433,392 | 2/1984 | Beaven | 364/200 |
| 4,434,475 | 2/1984 | McCaskill | 364/900 |
| 4,456,973 | 6/1984 | Carlgren et al. | 364/300 |
| 4,553,261 | 11/1985 | Froessl | 382/57 |
| 4,574,395 | 3/1986 | Kato | 382/61 |

Primary Examiner—James D. Thomas
Assistant Examiner—C. H. Lynt
Attorney, Agent, or Firm—Oblon, Fisher, Spivak, McClelland & Maier

[57] ABSTRACT

A data management apparatus includes a scanner for reading a plurality of pieces of image information, an optical disk for storing a plurality of pieces of image information read by the scanner, a keyboard for entering attribute names featuring the respective pieces of image information stored in the optical disk, a magnetic disk for storing classification names having higher correlation with the attribute names, and a display. The attribute name entered at the keyboard is used as a parameter to access the magnetic disk to retrieve the classification name having the highest similarity. This classification name is displayed on the display.

6 Claims, 19 Drawing Figures

FIG. 2C

| ATTRIBUTE NUMBER | ATTRIBUTE NAME |
|---|---|
| 1 | LSI |
| 2 | COMPUTER |
| --- | --- |
| TOTAL ATTRIBUTES | 900 |

FIG. 2B

| CLASSIFICATION NUMBER | CLASSIFICATION NAME |
|---|---|
| 1 | ELECTRIC/ELECTRONICS |
| 2 | PHYSICS |
| --- | --- |
| TOTAL CLASSIFICATION | 50 |

FIG. 2D

| CLASSIFICATION NUMBER | ATTRIBUTE NUMBER | | | | | | |
|---|---|---|---|---|---|---|---|
| | 1 | 2 | 3 | 4 | 5 | 6 | ... | 900 |
| 1 | 3 | 10 | 1 | 0 | --- | --- | 0 |
| 2 | 0 | 0 | 0 | 5 | --- | --- | 0 |
| --- | | | | | | | |

FIG. 8

| CLASSIFICATION NAME | ATTRIBUTE NAME | | | | | |
|---|---|---|---|---|---|---|
| PICTURE DATA | PICTURE ELEMENT (0.50) | PICTURE INPUT | DIGITAL PICTURE (0.17) | | | |
| PICTURE FILTERING | SMOOTHING (0.40) | LAPLACIAN OPERATION (0.30) | FOURIE TRANSFORM (0.20) | PICTURE ELEMENT (0.10) | | |
| PICTURE ANALYZING | CONCENTRATION CONVERSION (0.40) | GRAY LEVEL HISTOGRAM (0.30) | CT SCANNING (0.20) | TEXTURE ANALYSIS | | |
| PICTURE RECOGNIZING | THRESHOLD PROCESSING (0.33) | THINNING (0.27) | 4 NEIGHBORS (0.20) | FEATURE EXTRACTION (0.13) | OCR (0.07) | |

FIG. 9

| ATTRIBUTE NAME PATTERN | | | |
|---|---|---|---|
| THINNING (0.40) | 8-NEIGHBORS (0.30) | OCR (0.20) | FOURIE TRANSFORM (0.10) |

FIG. 10

| CLASSIFICATION NAME | SIMILARITY |
|---|---|
| PICTURE DATA | 0.00 |
| PICTURE FILTERING | 0.16 |
| PICTURE ANALYZING | 0.06 |
| PICTURE RECOGNIZING | 0.41 |
|  |  |

DATA MANAGEMENT APPARATUS

BACKGROUND OF THE INVENTION

The present invention relates to a data management apparatus capable of easily registering or entering document information.

Various types of data management apparatuses such as a document filing apparatus have been recently developed. In an apparatus of this type, an attribute name or key word is assigned as feature data to data to be filed, and the registered data can be retrieved by using the attribute name or the key word.

Along with the development of a modern society flooded with an enormous amount of information, the individual pieces of information to be registered or handled continue to increase. Under these circumstances, it is very important how information is classified and registered. In a conventional apparatus for registering the document information, an operator must decide a proper classification name of information to be registered with reference to a separate classification name list. This classification operation is time-consuming and cumbersome, and is very difficult for general users to perform. In addition, when new information whose number is not listed in the document classification table is handled (i.e. when registered data are retrieved to constitute new data), it is, of course, difficult to classify such new information. Particularly when the filing apparatus is used commonly by a plurality of users or only by a single user, data classification presents a difficult problem.

SUMMARY OF THE INVENTION

It is an object of the present invention to provide a data management apparatus capable of easily performing classification of new information with high efficiency.

According to the present invention, when a new document is classified in accordance with a given classification system, attribute data of the new information is registered. Upon entry of the attribute data, classification name candidates are displayed on the screen, so that the operator can easily register the new information with reference to the candidates.

In order to achieve the above object of the present invention, there is provided a data management apparatus having a display, comprising:

first input means for entering a plurality of image data;

first memory means for storing the plurality of image data entered by said first input means;

second input means for entering at least one attribute name which indicates a feature of each of said plurality of image data stored in said first memory means and displayed on said display;

classification name supplying means for supplying a classification name which has a highest similarity with the attribute name entered by said second input means; and second memory means for storing the attribute name entered by said second input means and the classification name from said classification name supplying means so as to correspond to said each of image data stored in said first memory means.

BRIEF DESCRIPTION OF THE DRAWINGS

Other objects and features of the present invention will be apparent from the following description taken in connection with the accompanying drawings, in which:

FIG. 1 is a block diagram of a data management apparatus according to an embodiment of the present invention;

FIGS. 2A through 2D show the data architecture in a management information storage section, in which FIG. 2A shows a document management data table, FIG. 2B shows a classification name table, FIG. 2C shows an attribute name table, and FIG. 2D shows the frequency of the attribute name table;

FIG. 8 shows the data architecture of a classification system storage section;

FIG. 9 is a table showing an entered attribute name pattern.

FIG. 10 is a table showing the similarity relationship between the entered attribute name pattern and the attribute name pattern in the classification system storage section.

DETAILED DESCRIPTION OF THE PREFERRED EMBODIMENTS

Figures 1, 2A:
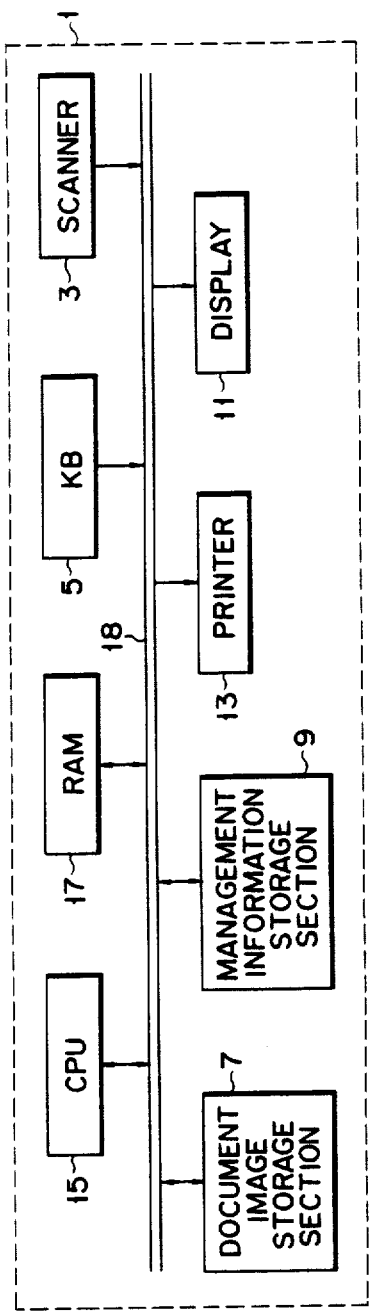

Referring to FIG. 1, a data management apparatus 1 of the present invention comprises: a scanner 3 for scanning a document and generating digital document data; a keyboard 5 for entering various types of commands; a document image storage section 7 which comprises, for example, an optical disk for storing document data entered by the scanner 3; a management information storage section 9 for storing the classification names and the attribute names which are assigned to the respective document images stored in the document image storage section 7; a display 11 for displaying the contents of the document image storage section 7 and the management information storage section 9; a printer 13 for printing out the contents described above; a central processing unit (CPU) 15 for controlling the above devices; and a main memory 17 comprising a random access memory (RAM). The above-mentioned devices are connected to each other through a common bus 18.

FIGS. 2A through 2D show the data format of the document management information stored in the management information storage section 9. FIG. 2A shows a document management data table 19 which has a document number column 21, a classification number column 23, an attribute number column 25, a start address column 29 of the document image stored in the document image storage section 7, a document size column 31, and a total document number column 33. The document management data table shown in FIG. 2A is an index data table. FIGS. 2B and 2C show examples of actual tables. More specifically, FIG. 2B shows a classification name table which has a classification number column 35, a classification name column 37, and a total classification number column 39. FIG. 2C shows an attribute name table 41 which has an attribute number column 43, an attribute name column 45 and a total attribute number column 47. In addition, FIG. 2D shows an attribute name frequency table 49 which has a classification number column 51 and an attribute number column 53. The attribute name frequency table 49 indicates which one of the attribute numbers among a plurality of attribute numbers in the attribute number column 53 assigned to respective classification numbers in the classification number column 51 has a highest similarity with a given classification number. In this embodiment, a maximum of 900 attribute numbers can be assigned to one classification number. The frequency of the attribute numbers is calculated for the respective classification numbers. The frequency can be defined as follows:

$$AK(i,j) = \text{(number of documents assigned with an attribute number } j \text{ when the documents are classified under a classification number } i\text{)} \quad (1)$$

In the above-mentioned table, attribute numbers 1, 2 and 3 and classification number 1 are assigned to the document with document number 1. The document with document number 1 is stored at block 0 as the start address in the document image storage section 7 and has a document size as paper size A4. As is apparent from FIG. 2B, the classification name of the document having document number 1 belongs to electrics/electronics and has attribute names such as "LSI" and "computer". As is apparent from the attribute name frequency table in FIG. 2D, the document having document number 1 corresponds to classification number 1. There are three documents having attribute number 1, and ten documents having attribute number 2.

The operation of the apparatus according to this embodiment will be described with reference to FIGS. 3A through 3D. In step 55 in FIG. 3A, the operator enters a necessary command at the keyboard 5. When the CPU 15 determines in step 57 that the document registration command is entered, the CPU 15 performs document registration processing in step 59. When the CPU 15 determines in step 61 that the classification system setting command is entered, the CPU 15 performs classification system setting processing in step 63. When the CPU 15 determines in step 65 that the classification name updating command is entered, the CPU 15 performs classification name updating processing in step 67. The classification system setting processing and the classification system updating processing will be described later.

First, document registration processing will be described.

Figure 3A:
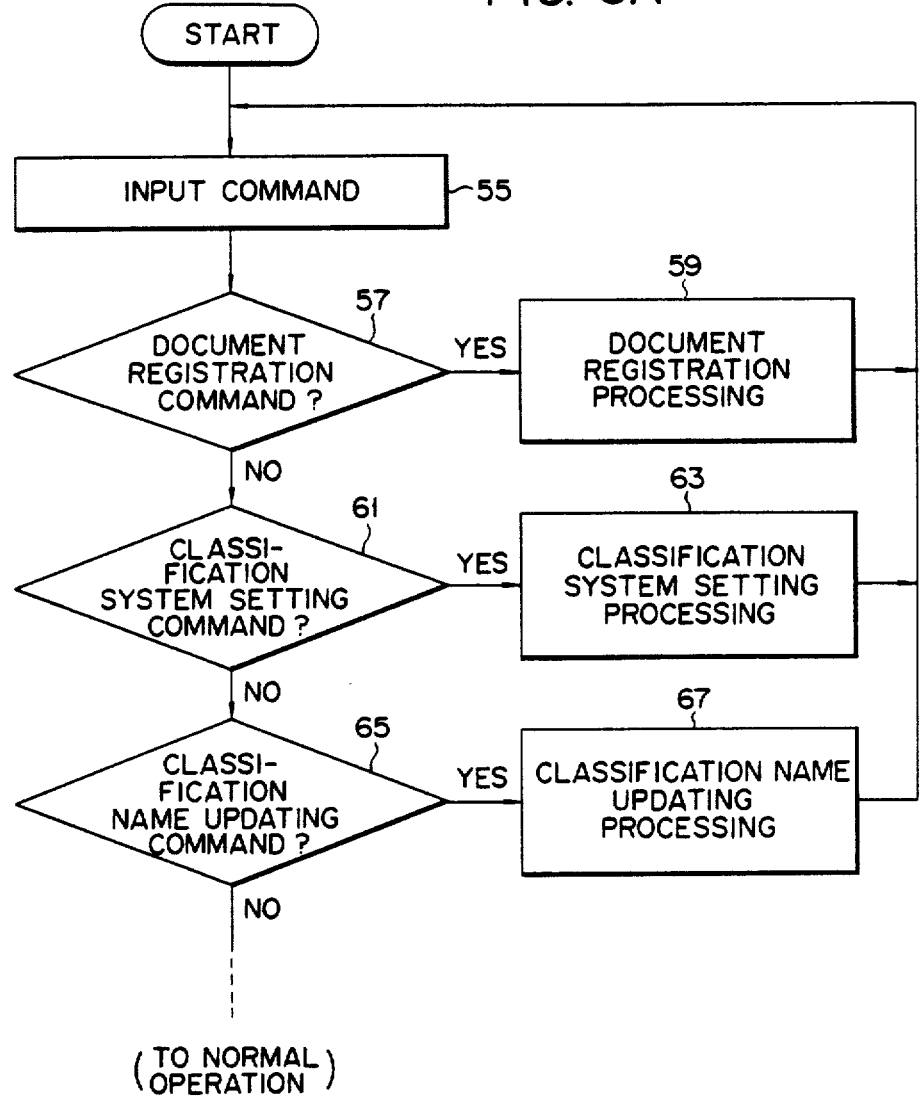
FIGS. 3A through 3D are respectively flow charts for explaining the operation of the data management apparatus shown in FIG. 1.
Figure 3B:
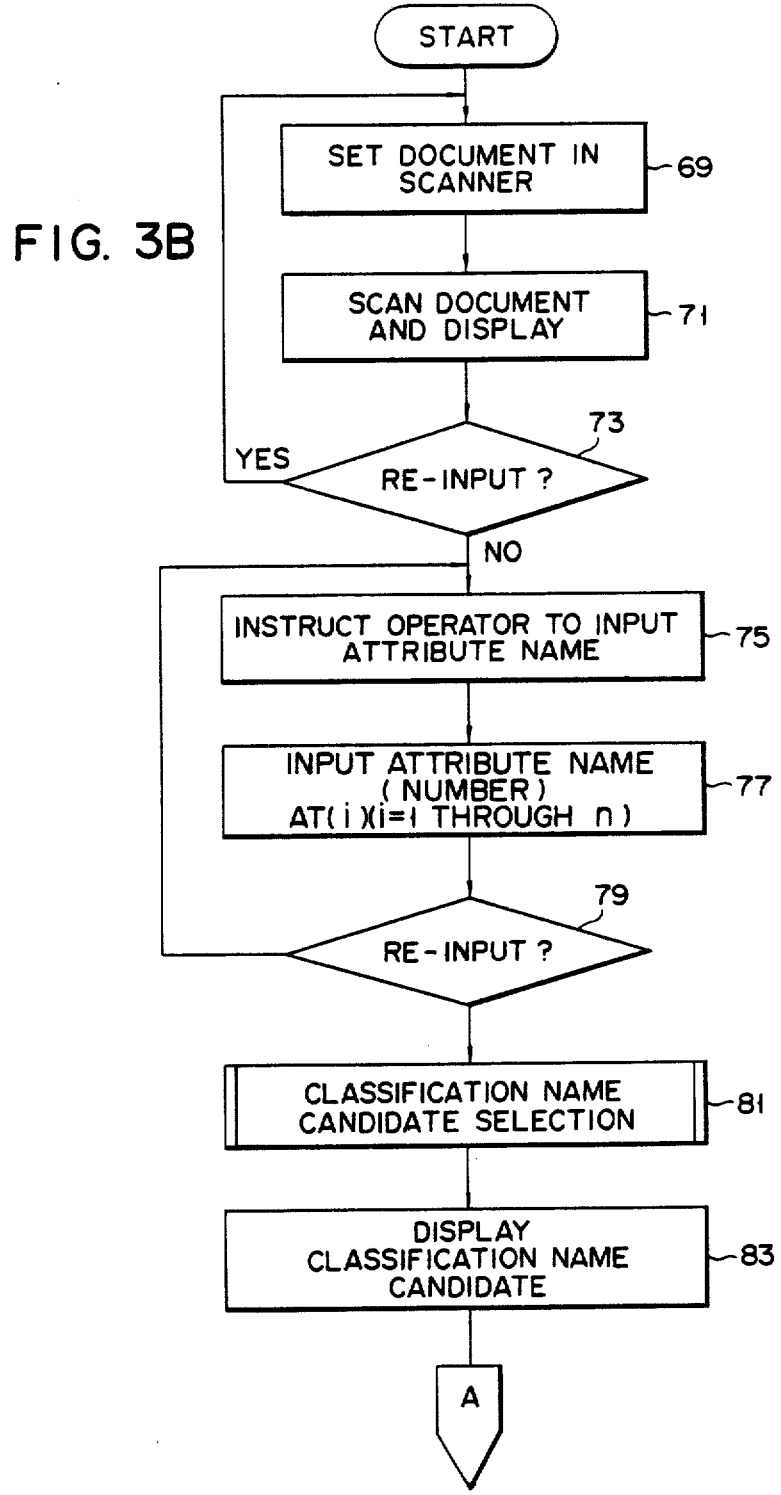
Figure 3C:
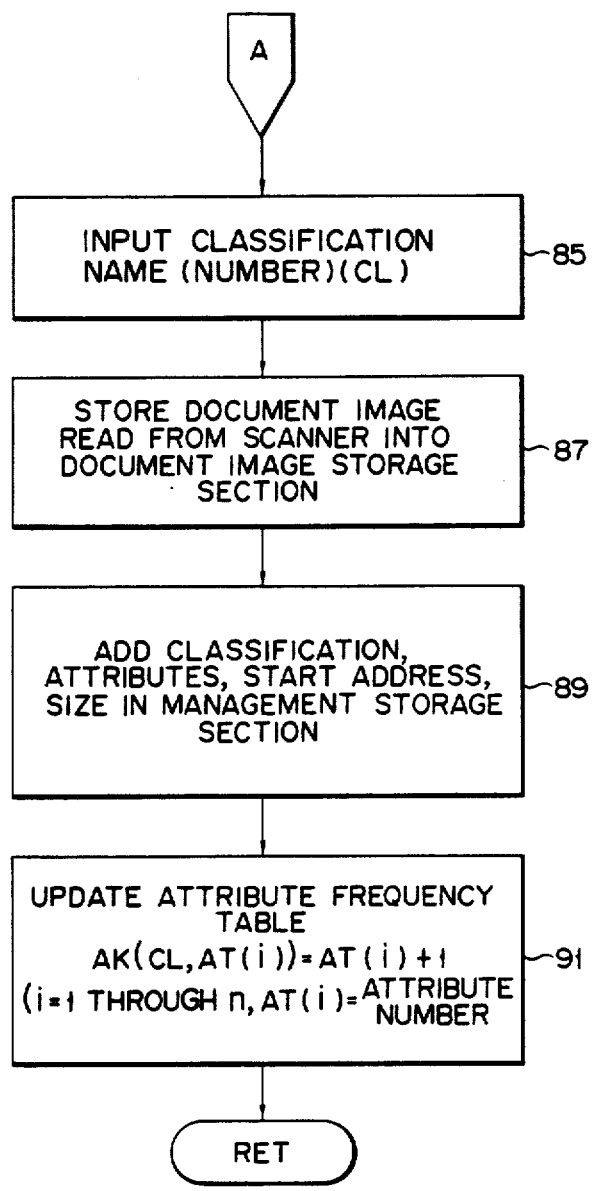
Figure 4A:
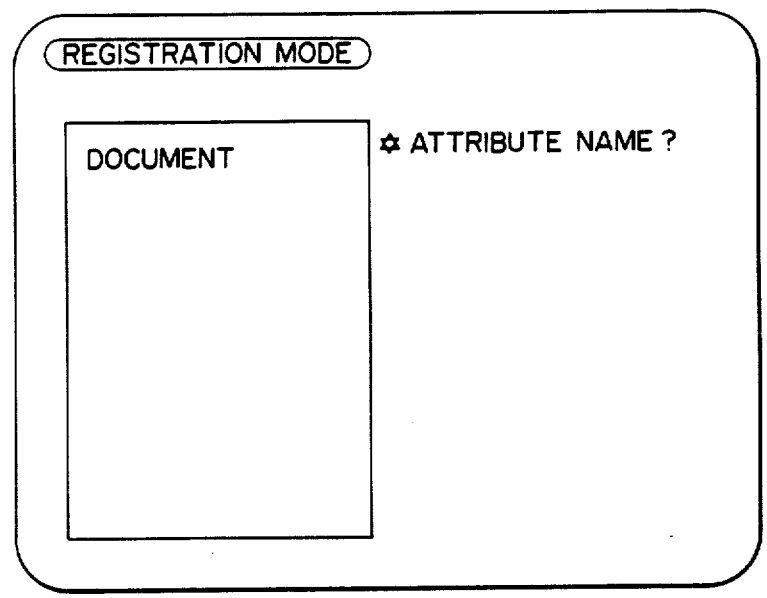
FIGS. 4A and 4B are respectively representations showing display examples on the display.
Figure 4B:
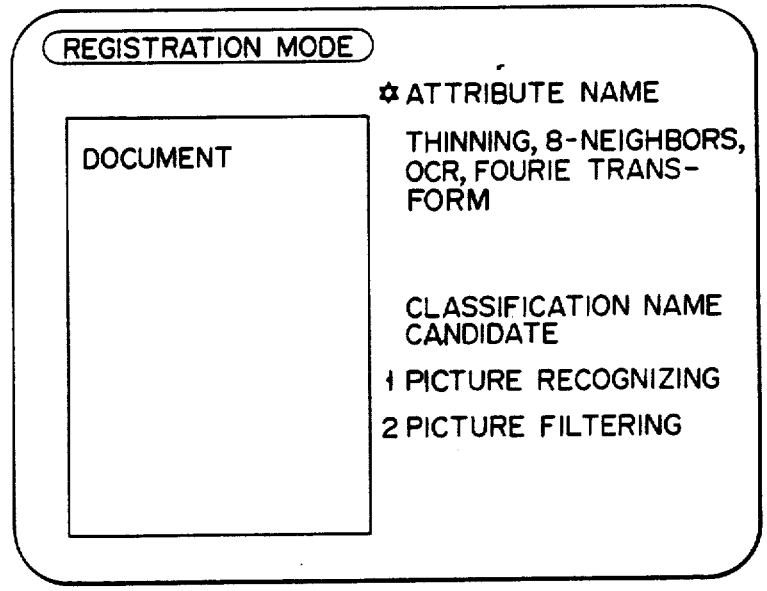

In step 69 in FIG. 3B, the document is set in the scanner 3. The document is scanned, and the scanned document data is displayed in step 71. The CPU 15 checks in step 73 whether or not the document information to be reentered is present. If YES in step 73, the flow returns to step 69. When all input operations are finished, the flow advances to step 75 from step 73. In step 75, the CPU causes the display 11 to display a prompt so as to instruct the operator to input an attribute name, as shown in FIG. 4A. The operator enters the attribute name(s) in step 77. In this embodiment, a maximum of 99 attribute names can be entered. Steps 75 through 79 are repeated until the entry of attribute names is finished. The CPU 15 performs classification name candidate selection in step 81. The classification name candidates are displayed on the display 11 in step 83, as shown in FIG. 4B. The flow advances to step 85, shown in FIG. 3C. In step 85, the operator selects the most suitable candidates (five in this embodiment) among the classification name candidates dislayed on the display 11. The document image read by the scanner 3 is stored in the document image storage section 7 in step 87. The CPU 15 adds a classification number, attributes, a start address and the size of the document image to the document managament data table (FIG. 2A) in the management information storage section 9. When the added classification name and the attribute names are not registered in the classification name table and the attribute name table shown in FIGS. 2B and 2C, respectively, these names are registered in the corresponding tables. In step 91, the attribute frequency table is updated. For example, when classification number 1 and attribute numbers 1, 2 and 3 are assigned to the registered document, $AK(1,1)$, $AK(1,2)$ and $AK(1,3)$ are respectively incremented by one.

Figure 3D:
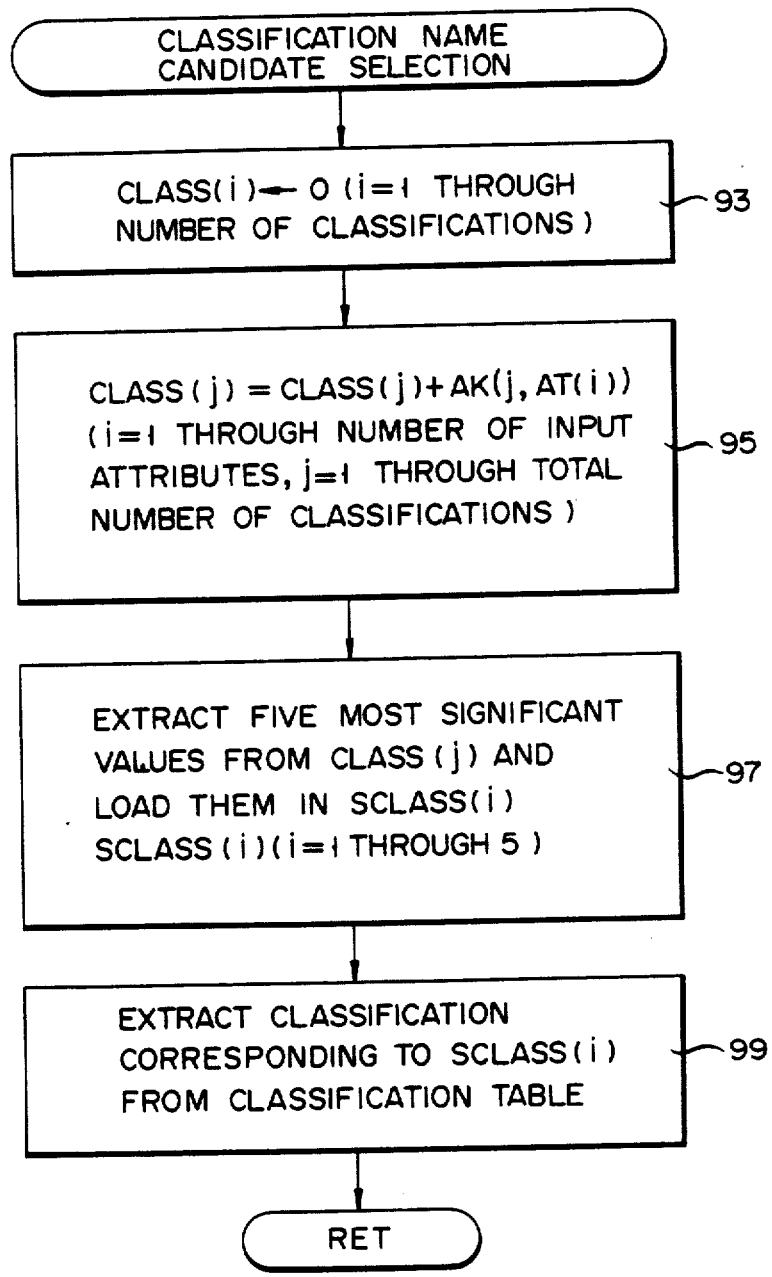

The classification name candidate selection processing routine will be described with reference to FIG. 3D. In step 93, the areas of CLASS(1) to CLASS(n) (n is the total number of classification names) are reset to zero in step 93. In step 95, the CPU 15 performs a calculation CLASS(j)=CLASS(j)+AK(j,AT(i)). In other words, when the input attribute names or the number AT(I) (I=1 through n) by an operator are 1, 2 and 3, in the case shown in FIG. 2D, "3", "10", "1" corresponding to the attribute numbers 1, 2 and 3 among ... documents indicated by attribute numbers 1 to 900 corresponding to classification number 1 are added, and a sum is stored in the area of CLASS (1). Similarly, "0" of attribute number 1, "0" of attribute number 2, "0" of attribute number 3 for classification number 2 are added, and a sum is stored in CLASS(2). The above operation is performed for all classification numbers. In step 97, the values set in CLASS(1) to CLASS(n) (where n is the total number of classification names) are compared with each other. Five largest values are selected in an order from the larger one to the smaller one. The corresponding classification name is extracted with reference to the attribute name frequency table on the basis of the selected classes SCLASS(i) (where i=1 to 5).

Figure 5A:
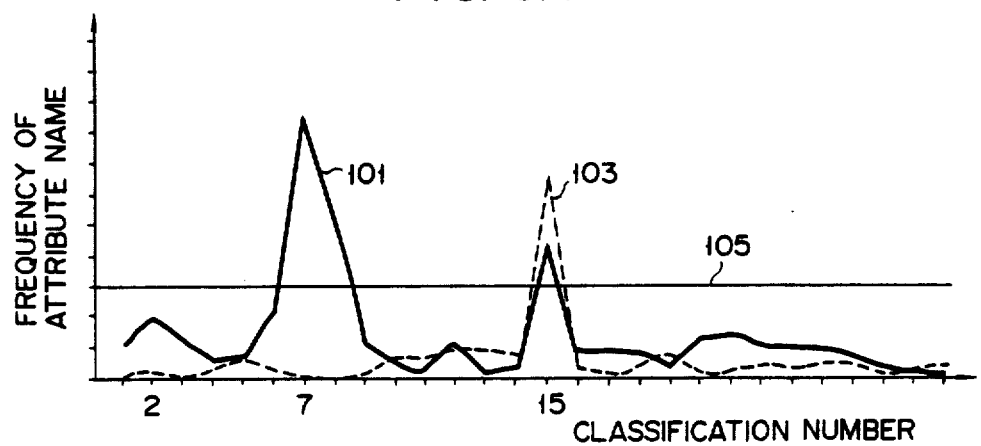
FIG. 5A is a graph showing the frequency of attribute name as a function of the classification number.
Figure 5B:
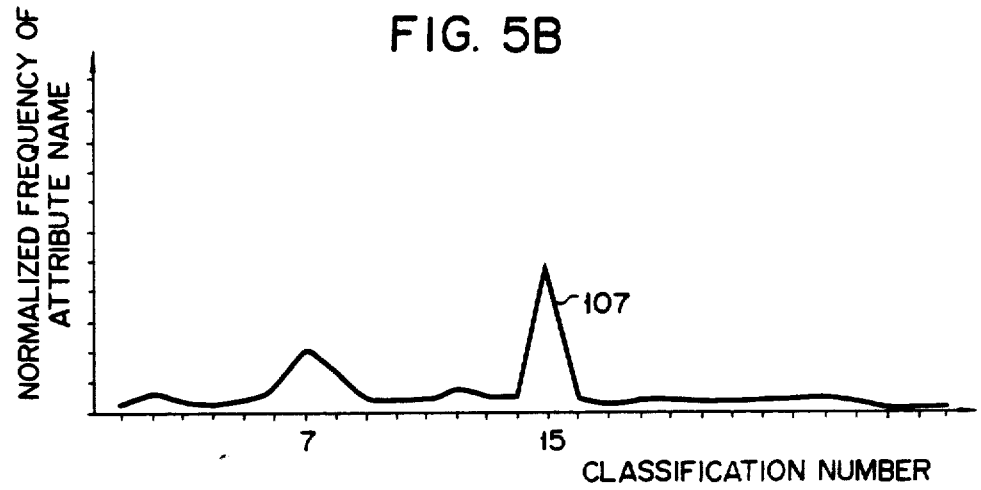
FIG. 5B is a graph showing the normalized frequency of attribute name as a function of the classification number.

FIGS. 5A and 5B show the frequency of attribute names as a function of classifiction number and the normalized frequency of attribute names as a function of classification number, respectively. Curves 101 and 103 respectively denote frequencies of given attribute names. The classification number is plotted along the abscissa, and the frequency of the attribute names is plotted along the ordinate. When the operator enters one attribute name, the corresponding frequency is indicated by, for example, the curve 101. When a threshold level is represented by curve 105, classification numbers 7 and 15 are sequentially selected as classification number candidates. In FIG. 5B, the curve indicated by reference numeral 107 shows the case wherein two attributes correponding to the curves 101 and 103 are entered and their frequencies are normalized and added together. In this case, the peaks of the frequency for the attribute of the curve 101 appear at classification numbers 7 and 15, while the peak of the frequency for the attribute of the curve 103 appears at classification number 15. As a result, the classification number candidates are selected in an order of 15 and 7. In this manner, when a plurality of attribute names are entered, the classification numbers corresponding to the overlapping peaks of different attribute names are selected as the candidates.

Without the need for understanding the complicated classification system, the attributes inherent to a given document are entered to automatically select the classification name candidates. Therefore, the operator can select any one of the classification names, thus greatly shortening the operation time.

In the above embodiment, when the operator cannot identify the attribute names to be entered, the contents of the management information storage section 9 are displayed on the display 11 to allow selection of proper attribute names among the displayed attribute names.

Figure 6:
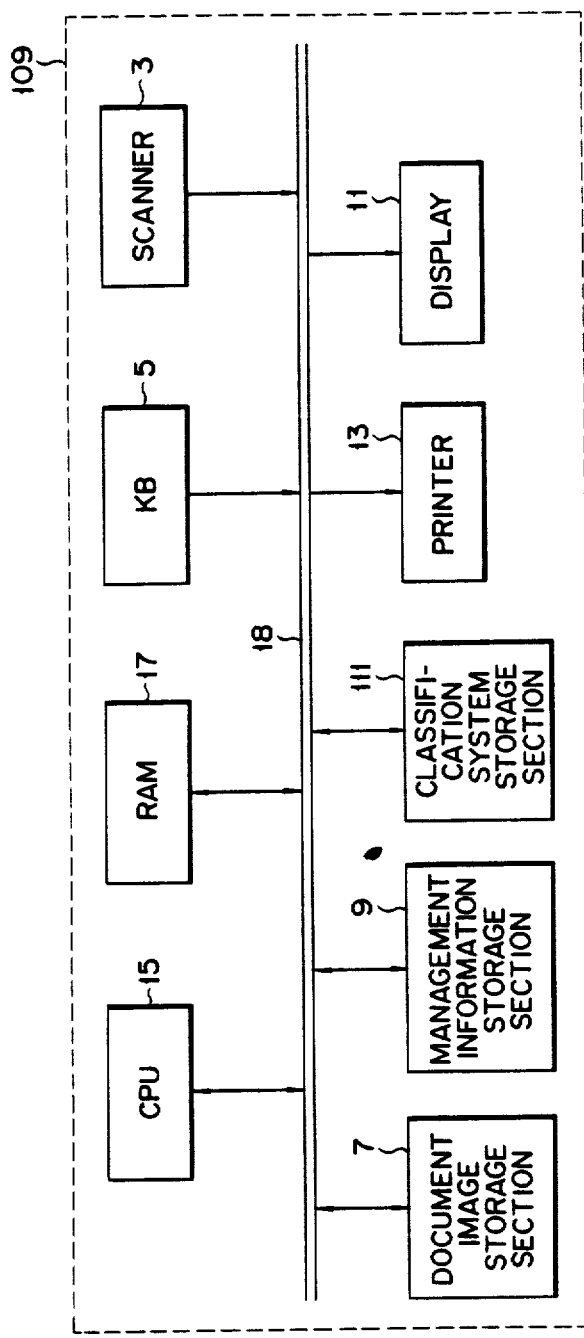
FIG. 6 is a block diagram of a data management apparatus according to another embodiment of the present invention.

FIG. 6 is a block diagram showing the overall configuration of a data management apparatus according to another embodiment of the present invention. The same reference numerals used in FIG. 6 denote the same parts as in FIG. 1, and a detailed description thereof will be omitted. The apparatus of FIG. 6 is substantially the same as that of FIG. 1, except that a classification system storage section 111 is included. The classification system storage section 111 stores a plurality of attribute names each of which corresponds to a given classification name. The extraction of such an attribute name will be described later.

In this embodiment, the plurality of attribute names entered at the keyboard 5 so as to correspond to the document image to be newly stored in the document image storage section 7 are compared with the plurality of attribute names each of which represents a corresponding one of the classification names. A proper classification name is selected to classify the document image to be registered in accordance with a reference result such as similarity.

Figure 7:
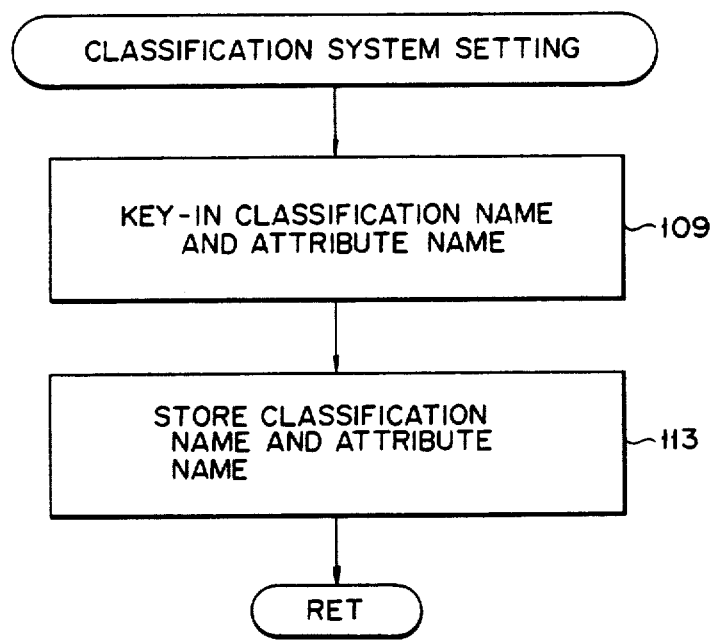
FIG. 7 is a flow chart showing a classification system setting routine.

The classification system is set in the process shown in the flow chart of FIG. 3A through 3D such that a classification system setting command is entered in step 55 and a classification system setting subroutine is executed in step 63. In other words, in step 109 of FIG. 7, a classification name as a classification item for the plurality of document images is entered at the keyboard 5. In addition, the operator enters the attribute names which are judged by the operator to be included in the classification name. For example, when a classification name "recognition processing" of the image is set, the operator enters attribute names as typical keywords such as "threshold processing", "thinning", "4 neighbors", "feature extraction" and "OCR". When the operator cannot set a classification name which represents the entire image since a plurality of attribute names are plausible, one of the attribute name candidates which is considered to be the highest-order category can be set to be the classification name. In this case, other attribute name candidates are defined as attribute names belonging to this classification name. The classification name and the corresponding attribute names are stored in the classification system storage section 111 such as a magnetic disk in step 113.

The similarity between the attribute pattern entered by the operator as described above and the attribute name pattern controlled in units of classification names is calculated. The similarity results are compared with each other to select the classification name candidates of the document image assigned with the input attribute name pattern.

The classification name candidate selection will be described in more detail below. The classification system storage section 111 stores the plurality of classification names and a plurality of attribute names (as the attribute name pattern) which respectively represent the classification names, as shown in FIG. 8. These patterns are ordered from the pattern most closely associated with the classification names. The respective attribute names are weighted such that a total sum becomes 1.00 so as to represent the degree of association. In the example shown in FIG. 8, the weighting coefficients "0.50", "0.33" and "0.17" of the respective attribute names of the attribute name pattern belonging to the classification name "image data" are assigned to the "pixel", the "image input", and the "digital image", respectively. In general, when a given classification is represented by N attribute names, the weighting coefficient of the nth (0 to N−1) attribute name is given as follows:

$$2(N-n)/\{N(N+1)\}$$

However, when the attribute pattern entered for the document image to be registered is given as shown in FIG. 9, the weighting coefficients are given to the respective attribute names of this attribute pattern. Now assume that the weighting coefficient of the ith attribute name of the attribute pattern and the weighting coefficient of the jth attribute name of the attribute name pattern stored in the classification system storage section 111 are given to be xi and yj, respectively. The similarity of these attribute name patterns is given by:

$$y_j (1-|x_i+y_j|)/(1+|x_i-y_j|)$$

as the sum of the evaluation values between every two attribute names. The similarities are obtained for attribute patterns of all classification names stored in the classification system storage section 111, as shown in FIG. 10, and the classification names having higher similarities are produced as the classification name candidates of the document image. In this case, the "image recognition processing" and the "image file processing" are produced as the classification name candidates. Among these classification names, the operator selects the proper classification name, and the corresponding document image is registered.

Figure 11:
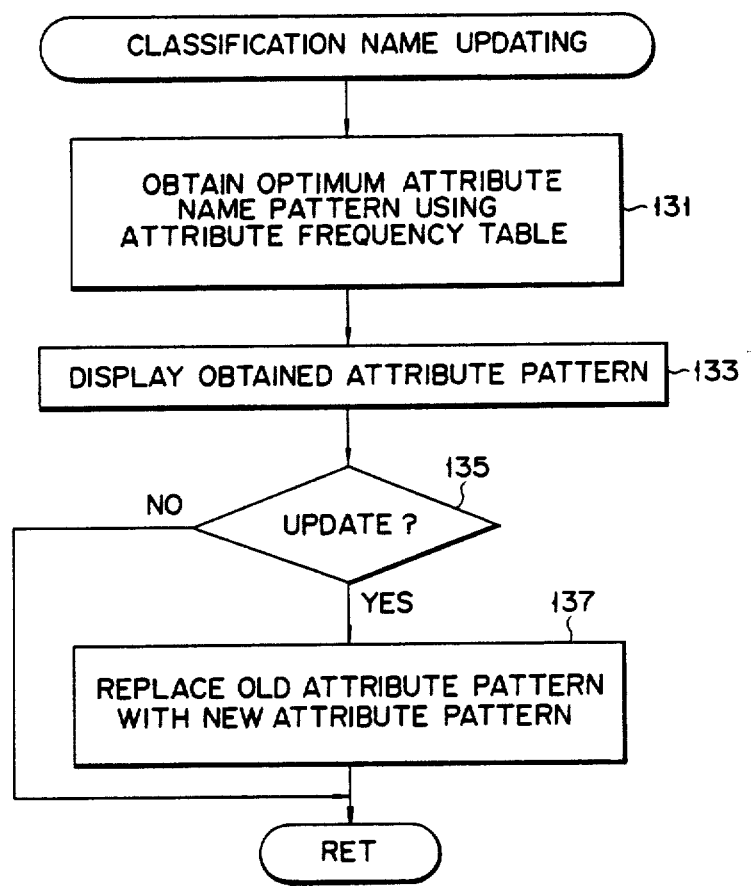
FIG. 11 is a flow chart of a classification name updating subroutine.

When the document images are sequentially registered, the group of attribute names included in a given classification name may become different from the attribute name pattern representing the given classification name. This is mainly because the judgment in document images of the operator changes over time. Therefore, at a given interval, the information stored in the management information storage section 9 and the classification system storage section 111 are read out to monitor the change in judgment of the operator. When the change in judgment is large, the change must be corrected. The classification system updating processing is performed such that the classification system updating processing command is entered at the keyboard 5 and the classification system updating processing routine of FIG. 3A is executed. More particularly, in step 131 of FIG. 11, the attribute names are picked up in an order starting from a higher frequency with reference to the attribute name frequency table in the document image storage section 7. The picked-up attribute names are displayed on the display 11. When the operator judges that the attribute names should be updated with reference to the new attribute candidates, the key input operation for this purpose is performed at the keyboard 5. As a result, in step 137, the old attribute name pattern in the management information storage section 9 is replaced with a new attribute name pattern.

What is claimed is:

1. A data management apparatus comprising:
   scanning means for scanning a document image to provide digital document image data;
   document image memory means for storing said document image data;
   input means for entry of attribute data relevant to said document image data;
   management data memory means for storing classification data and an attribute occurrence frequency table in which plural attribute data are assigned to each of the classification data, and in which frequency of occurrence data equal to the number of documents having a particular attribute j (j: an integer equal to or greater than 1) in classification i (i: an integer equal to or greater than 1) is appended to each of the attribute data;
   a central processing unit for accessing said management data memory means using said attribute data entered through said input means as a parameter, for computing the frequency of occurrence of the attribute data entered by the input means, for calculating the sum of the frequency of occurrence data of each of said attribute data for each of the classification data, and for selecting classification data having attribute data with a predetermined large sum of frequency of occurrence data; and
   display means for displaying said plural classification data selected by said central processing unit, whereby the operator can select a single of the classification data and thereby efficiently classify a document.

2. The apparatus according to claim 1, wherein:
   said management data memory means further comprises an attribute table which stores predetermined attribute numbers and attribute names associated with said attribute numbers; and
   said central processing unit comprises means for referring to said attribute table and obtaining an attribute number associated with the attribute name entered by means of said input means when said operator enters an attribute name via said input means.

3. The apparatus according to claim 1, wherein:
   said management data memory means further comprises a classification table which stores predetermined classification numbers and classification names associated with said classification numbers,
   said classification data in said attribute occurrence frequency table is expressed by said classification numbers, and
   said central processing unit refers to said classification table using said plural classification data, which are selected by said central processing unit by referring to said attribute occurrence frequency table, as parameters so as to obtain classification names associated with said selected plural classification data, and allows said display means to display said obtained classification names.

4. The apparatus according to claim 1, wherein said management data memory means further comprises:
   a document image management data table for storing a document data number, a classification number associated with said document image number, a plurality of attribute numbers associated with said classification number, and a starting address and a size of a document image, such that said central processing unit can write attribute numbers entered by said operator, classification numbers selected by said operator and the starting address and the size of said document image in said document image management data table.

5. The apparatus according to claim 1, wherein said central processing unit comprises:
   means for normalizing the sums and selecting classification data associated with those of the normalized sums which exceed a predetermined threshold value after calculating the sum of the frequencies of occurrence of said attribute data entered through said input means for each classification data.

6. A data management apparatus comprising:
   scanning means for scanning a document image to provide digital document image data;
   document image memory means for storing said document image data;
   input means for entry of at least one of attribute data relevant to said document image data;
   classification system memory means for storing a predetermined list of classification data of said document image data and plural attribute data which relate to said classification data and are given predetermined weighting coefficients according to a degree of relevance between said classification data and said attribute data;
   a central processing unit for assigning a weighting coefficient to the attribute data entered via said input means such that when more than one of the attribute data is entered, the sum of the weighting coefficients of the entered attribute data becomes one and the first of the attribute data entered has the largest weighting coefficient, and for assessing said classification system memory means to compute the weighting coefficients of the attribute data entered via said input means and the weighting coefficients of the same attribute data as the entered attribute data, which is stored in said classification system memory means, based on an equation expressed by $Xi=2(N-n)/(N(N+1))$, where N is the number of attribute data, Xi is the weighting coefficient of the nth attribute data and $0 \leq n \leq (N-1)$, and computing a similarity between the entered attribute data and the attribute data stored in said classification system memory means for each of the classification data based on an equation given by $yj(1-|xi+yj|)/(1+|xi-yj|)$, where xi is the weighting coefficient of the ith attribute data entered and yj is the weighting coefficient of jth attribute data stored in said classification system memory means, and selecting the classification data, whose similarites are large, from all the classification data; and
   display means for displaying said classification data selected by said central processing unit, whereby the operator can efficiently select a single of the classification data as the classification of the document being classified.

* * * * *